ically by

United States Patent Office 3,350,784
Patented Nov. 7, 1967

3,350,784
TOOL ATTACHMENT
Harry J. Schabel, 691 Washington St.,
Elmhurst, Ill. 60126
Filed Aug. 5, 1965, Ser. No. 477,451
5 Claims. (Cl. 33—75)

ABSTRACT OF THE DISCLOSURE

A foldable, arcuately shaped instrument having clamping means at each end for detachably connecting the same to a carpenter's square and provided with angular measurement scale means and combination pitch and pitch scale means thereon so as to facilitate the laying out of angular construction work, the determination of the magnitude or values of angles between structural members, the direct conversion of pitch and pitch-cuts to angular degrees and vice versa, and the fabrication of ramps, rafters, polygons and other geometric figures involving pitch or angle cuts.

This invention relates to an attachment for a square of the type commonly employed by carpenters and other mechanics and artisans, and, more particularly, to a new and improved device which is capable of being conveniently stored and transported by the artisan and which is quickly and easily attachable to a conventional square and is cooperable with the square in a novel manner so as to facilitate the laying out of angular construction work, the determination of the magnitudes or values of angles between structural members, the direct conversion of pitch and pitch-cuts to angular degrees and vice versa, and the fabrication of rafters, ramps, polygons and other geometric figures involving pitch or angle cuts.

It is presently the common practice in the building trades for the architect or structural engineer to specify angular disposition of structural members in terms of angular degrees in the building specification and drawings or plans. The angular disposition of an incline, slope, ramp or roof is usually given in angular degrees rather than in terms of pitch. However, it was heretofore impossible for the carpenter or other artisan to directly convert degrees of angular disposition to particular pitch-cuts on his square or any other tool or device generally employed by him in his work. Consequently, much valuable time is lost since it is necessary for the carpenter employed to actually do the angulated construction work to first convert the degree designations to pitch and pitch-cut designations of which he is familiar before any cuts could be made. The blade and tongue of a standard carpenter's square lack means for enabling the direct conversion of angular degrees to pitch-cuts. The conversion of angular degrees to pitch or pitch-cuts involves reference to appropriate text books or the like where conversion tables are compiled. The carpenter is required to have such a conversion table available at all times. It is obvious, the above method presently employed by the vast majority of carpenters and artisans is time-consuming and bothersome and unless the workman is thoroughly familiar with the method, many mistakes and errors in the conversion calculation oftentimes occurs. It is, therefore, one of the primary objectives of the present invention to substantially reduce the time and effort required by the carpenter or other artisan in the accomplishment of angular structural work by providing a novel compact light weight, and portable device which is readily attachable to a conventional carpenter's square and which, in conjunction with the square, render such angular structural work relatively easy and highly accurate.

Another object of the invention is to provide improved means for measuring angles directly without the necessity of employing templets or the like in conjunction with protractors.

Still another object is the provision of an attachment for a carpenter's square by virtue of which the person using the square and attachment may obtain all of pitch-cuts necessary in angular roof and hopper work, and the like directly and accurately, regardless of the particular skill of the workman.

Still another object of the present invention is to provide an attachment for a carpenter's square wherein angular layout work may be readily accomplished and by employing a templet in conjunction therewith, the angular orientation of building structures such as walls, beams, etc. may be quickly and accurately measured.

A further object is to provide an attachment for a carpenter's square which is foldable so as to be compact and relatively small and readily carried in a carpenter's tool box when not being used but which is capable of being unfolded and applied to the carpenter's square for use with a minimum amount of effort and which is relatively large in size when in condition for use to afford a finer degree of accuracy than heretofore possible with prior art tools of similar design and purpose.

A still further object is to provide an attachment capable of being employed in lieu of a surveyor's transit for angular lay-out work where it is inconvenient and/or impractical to use a surveyor's transit because of the limited space or area available for using the transit or where the job is so small that the purchase of a transit would not be warranted or justified.

Still another object is to provide a relatively inexpensive tool which is compact when not in use so as to be readily portable but which, in use, affords large, easily read scales so that accurate angular measurements to about one minute are possible and such scales are uniquely oriented with respect to the scales of the carpenter's square to which the tool is attached that linear measurements such as inches are combined and correlated with angular measurements such as degrees in such a manner that the use of the attachment is rendered simple and in the language of the carpenter and, hence, understandable to practically all carpenters or other artisans regardless of the skill possessed by them.

The foregoing and other important objects and desirable features, inherent in and encompassed by the invention, together with many of the purposes and uses thereof, will become readily apparent from a reading of the ensuing description in conjunction with the annexed drawing, in which, FIGURE 1 is a side elevational view of an attachment constructed and arranged in accordance with the invention, the attachment is illustrated in conjunction with a carpenter's square;

FIGURE 2 is a fragmentary sectional view taken substantially along line 2—2 of FIGURE 1;

FIGURE 3 is a sectional view similar to FIGURE 2 taken substantially along line 3—3 of FIGURE 1;

FIGURE 4 is a view similar to FIGURE 1 illustrating somewhat diagrammatically one manner in which the invention may be utilized to convert pitch-angle cuts to units of angular degrees, or vice versa;

FIGURE 5 is a view similar to FIGURE 4 showing the manner in which a particular angle (or pitch-angle cut) would be laid out on a work piece.

FIGURE 6 is an enlarged, fragmentary side elevational view of an arcuately-shaped section of the attachment illustrating portions of the various scales appearing on a surface thereof.

Referring to the drawing in detail, wherein like reference characters represent like elements throughout the various views, the attachment, designated generally by reference character 10, is shown in conjunction with a conventional measuring and layout instrument or tool commonly known as a carpenter's square 11. The square 11 is generally made of steel or other durable metal and is employed in a well known manner by carpenters and other mechanics and artisans in their work. The square 11 includes a relatively long leg 12 of 24 inches usually referred to as the "blade" of the square 11 and a shorter leg 13 of 16 inches commonly called the "tongue" of the square 11. The blade 12 and tongue 13 are integrally formed and extend at right angles with respect to each other and generally have a uniform thickness of approximately ⅛ inch. As best shown in FIGURE 1, the blade 12 and the tongue 13 of the square 11 are provided with straight outer side edges 14, 15, respectively. At least one flat face or surface 16 of the blade 12 is provided with a scale 17 along the straight side edge 14 thereof. The graduations or scale marks 18 of the scale 17 are embossed, engraved, impressed or placed on the flat face 16 by any suitable means so as to be readily visible and adjacent scale marks are generally spaced a predetermined, uniform fractional part of an inch apart. In a like manner, the flat face or surface 19 of the tongue 13 is provided with a linear measurement scale 20 along the straight side edge 15. Thus, the straight side edges 14, 15 of the square 11 are divided into inches, which are further subdivided into fractions of an inch so that the graduations 18 of the scale 17 and the graduation 21 of the scale 20 represent units of linear measurement in feet, inches and fractions of an inch. The zero point of each scale 17 and 20 is at the intersection of the straight side edges 14, 15. The square 11 may be employed for measuring purposes by utilizing the scales 17, 20.

The attachment 10 comprises two arcuately shaped segments 22, 23, each having substantially the same arcuate length which is approximately ⅛ of the circumference of a circular ring. To permit the attachment 10 to be folded into a compact space wherein a flat back or bottom face 24 of the segment 22 overlies and abuts a flat face 25 in a back-to-back relationship when not in use, respective ends of the segments 21, 23 are preferably connected together for relative pivotal movement by means of a hinge structure 26 attached to the back faces 24, 25 as best illustrated in FIGURE 2.

Referring to FIGURE 3, it will be noted that the end edge 27 of the segment 23 opposite the end hingedly connected to the segment 22 is provided with a U-shaped element 28, one leg 29 of which is rigidly fastened to the segment 22 as by welding or other suitable means. The bight portion 30 of the U-shaped element 28 abuts the end edge 27 and is dimensioned so as to space the leg 31 of the U-shaped element 28 a distance substantially equal to or slightly greater than the thickness of the blade 12. As best illustrated in FIGURE 3, the leg 31, bight portion 30 and an end portion of the segment 23 define a pocket into which a portion of the blade 12 adjacent the side edge 14 is adapted to be received. The segment 23 is also provided with a threaded recess 32 therethrough which is arcuately spaced from the end edge 27 a distance less than the width of the blade. An attachment screw 33 having an enlarged knurled head is adapted to be threaded into the recess 32. When it is desired to mount the attachment 10 on the carpenter's square 11, the leg 31 of the element 28 is hooked over a blade edge portion and thereafter the screw 33 is rotated in a direction to force the tip 35 thereof tightly into frictional engagement with the top flat face 16 of the blade 12. From the foregoing, it will be appreciated that the structure described hereinbefore permits one end of the segment 23 to be firmly yet releasably clamped to the blade 12.

While not shown in detail, it is to be understood that the free end of the segment 22 is also provided with a U-shaped element and an attaching screw 36 which are operable and cooperable with the tongue 13 in the same manner that the U-shaped element 28 and screw 33 are operable and cooperable with the blade 12 so as to provide means for releasably clamping the segment 22 to the tongue 13. From the foregoing, it will be appreciated that in order to fasten the attachment 10 to the carpenter's square 11 the segments 22, 23 are unfolded from their compact, back-to-back stored or closed position to an open position wherein they extend arcuately and are arranged end-to-end. The attachment 10 is then positioned over the carpenter's square 11 with each U-shaped element hooked over a respective edge portion of the blade 12 or tongue 13. Thereafter, both attaching screws 33, 36 are tightened to releasably secure the attachment 10 to the carpenter's square 11.

As stated hereinbefore, the attachment 10 is preferably made so as to be considerably larger than a conventional protractor of the type generally commercially available to carpenters and like artisans. In fact, the vast majority of carpenters do not carry a protractor of any kind in their tool bags. The relatively large size of the attachment 10 is apparent from a viewing of FIGURE 1. The outermost curved edges 37, 38 of the segments 22, 23, respectively are in arcuate alignment when the attachment 10 is fastened in place on the carpenter's square 11 and have a radius of curvature of approximately 16 inches. In other words, the outermost side edges 37, 38 extend from the 16 inch mark 21 of the scale 20 on the tongue 13 (which is the terminal edge thereof) to the 16 inch mark 18 of the scale 17 on the blade 12. It will be appreciated, therefore, that the attachment 10 is of a relatively large size when in position for use and, consequently, the scale notations (which will be described in detail presently) appearing the flat front or top faces 39, 40 are relatively large and, thus, very legible. Obviously, more accurate measurements can be made with the attachment 10 by constructing it in this enlarged manner in comparison to the miniature form usually taken by conventional, commercially available protractors.

Referring in particular to FIGURES 1 and 6, it will be observed that the front faces 39 and 40 of the segments 22 and 23, respectively, are provided with four concentric, radially spaced lines 41, 42, 43 and 44. The lines 41, 42, 43 and 44 may be applied to the front faces 22, 23 by embossing, engraving, painting or other suitable means. A plurality of cross lines 45 extend radially from either the outermost curved side edge 37 or the edge 38 to the radially innermost line 41 of the arcuate lines 41, 42, 43 and 44. Adjacent cross lines 45 are angularly spaced a distance of 5 degrees with respect to each other measured along the outermost side edges 37, 38 of the segments 22, 23, respectively, and each sector of the face 39 or 40 between each pair of adjacent cross lines 45 along the outermost side edges 37 and 38 is further graduated into units of one degree, as indicated by the cross lines 46. The arcuate distance between adjacent cross lines 46 is, in turn, further subdivided into fractions of a degree or increments of 10 minutes by a series of relatively short cross lines 47. From the foregoing, it will be appreciated that each segment face 39 and 40 is graduated into 45 degrees and when the segments 22 and 23 are in their open position as shown in FIGURE 1, the segment faces 39 and 40 provide an arcuate surface graduated into ninety degrees. Each of the arcuate lines 41, 42, 43 and 44 is part of a plurality of angular measurement scales and each of such scales also includes the graduation lines 45, 46 and 47. The graduation lines 45 of the scale which includes the arcuate line 44 are marked or numbered from zero degrees to ninety degrees with the zero mark or line 45 located in vertical alignment with the straight edge 14 of the blade 12, as viewed in FIGURE 1, and with the ninety degree graduation 45 in vertical alignment with the straight edge 15 of the tongue 13. In a similar manner, the graduation lines 45 of the scale which includes the arcuate line 43 are also numbered from zero degrees to ninety degrees in five degree increments with the ninety degree graduation mark 45 of such scale in alignment with the zero degree graduation mark 45 of the scale that includes the line 44 and the zero degree graduation line 45 at the opposite end of such scale with the side edge 15 of the tongue 13. Thus, the zero graduation mark 45 of the first mentioned scale also serves as the ninety degree graduation mark of the scale that includes the line 43. The graduation lines 45 of the two scales spaced radially inwardly from the aforementioned scales, each of which includes a respective one of the arcuate lines, 41, 42 are similarly numbered. The angular measurement scale including the line 42 is subdivided by the cross marks 45 which are numbered from ninety to one hundred eighty degrees with the ninety degree graduation mark 45 corresponding to the zero degree graduation mark of the scale including the arcuate line 44. The angular measurement scale which includes the arcuate line 41, in turn, extends angularly in exactly that same manner as the angular scale adjacent thereto with the exception that the one hundred eighty degree graduation mark 45 corresponds to the ninety degree graduation mark 45 of the adjacent singular measurement scale described above and the ninety degree graduation mark corresponds to the one hundred eighty degree graduation mark 45 of such adjacent scale and is in alignment with the straight edge 15 of the tongue 13. From the foregoing, it will be appreciated that angular measurements can be made with the straight side edge 14 of the blade 14 serving selectively as the zero, ninetieth, or one hundred eighty degree mark or line. Thus, a carpenter or other artisan using the attachment 10 in conjunction with the square 11 may readily and accurately measure and determine the angular orientation of physical structures as well as do the preliminary layout work for structures that are to be angularly oriented regardless of whether the angles are arcuate or obtuse. The angular orientation lines can be run from zero to 360 degrees in either direction by using the intersection of the side edges 14 and 15 of the blade 12 and the tongue 13, respectively, as a reference point and the side edge 14 as a zero, ninety, or one hundred eighty degree reference line. Hence, if it is desired to lay out a particular line oriented a given number of degrees from a reference line, the side edges 14 is placed in alignment with such reference line (or at right angles to such reference line). Thereafter a straight line is run over the desired angle degree mark on the angular measurement scales by means of a straight edge or carpenter's snap chalk line. The manner in which the four angular measurement scales may be utilized to measure or to layout acute as well as obtuse angles is believed readily understandable from the foregoing.

In addition to the four angular measurement scales described above the attachment 10 is further provided with a combination pitch and pitch-cut scale designated generally by numeral 48. The combination scale 48 is provided on the front faces 39 and 40 of the segments 22 and 23, respectively and includes the innermost side edges 49 and 50 of such segments 22, 23 respectively. Portions of the front faces 39, 40 radially inwardly of the arcuate line 41 are divided into sectors 51 by means of a plurality of angularly spaced lines or graduation marks 52 which extend radially from the innermost side edges 49, 50 to the arcuate line 41. While eleven such scale marks 52 are illustrated in FIGURE 1, it is to be understood that a greater or lesser number could be provided without departing from the spirit and scope of the invention. Each graduation 52 of the combination scale 48 bears two indicia, as indicated by numerals 53 and 54. Numeral 53 represents the "pitch" and numeral 54 represents the "pitch-cut" of each scale line 52. Thus, the scale line 52 angularly spaced closest to the side edge 14 of the blade 12 when the attachment 10 is assembled on the square 11 is labeled with a "pitch" of $\frac{1}{12}$ and "pitch-cut" of 12–2. Each sector 51 is further divided into eighths by a plurality of relatively short scale marks 55, to facilitate and to render more accurate the determination of "pitch" or slopes and pitch-cuts. The combination "pitch" and "pitch-cut" scale 48 is numbered from zero pitch to full pitch and 12–0 pitch-cut to 12–24 pitch-cut, the zero pitch, 12–0 pitch-cut line 52 being in vertical alignment with the side edge 14 of the blade 12. It will be appreciated that the sectors 51 are necessarily of unequal arcuate length, the longest sector 51 being the one extending between the side edge 14 of the blade 12 and the 12–2 pitch-cut—$\frac{1}{12}$ pitch scale line 52 and the shortest sector 51 extending between the 12–22 pitch-cut—$\frac{11}{12}$ pitch scale line 52.

From the foregoing, it is obvious that the "pitch" and "pitch-cut" corresponding to any given angle may be readily determined without the necessity of mounting the attachment 10 on the square 11. It is merely necessary to note the particular angle notation on the appropriate one of the angular measurement scales which includes the arcuate lines 41, 42, 43 and 44 and run a radial line to the "pitch" and "pitch-cut" scale 48. Thereafter the "pitch" and "pitch-cut" corresponding to the particular angle is read directly. Obviously, once the pitch-cut is known, the plumb cut and heel cut are established in a conventional manner by the user of the attachment 10.

From the foregoing, it will be appreciated that a unique and novel attachment 10 has been provided which skillfully combines inches or linear measurement scales with degrees or angular measurement scales in a manner readily understandable by the carpenter trade since it relates to standard carpenter framing methods. The embodiment of the invention chosen for the purposes of description and illustration herein is preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other adaptations and modifications as fall within the spirit and scope of the invention as defined in the appended claims.

What is claimed is:

1. The combination with a carpenter's square of the type having an elongated blade and an elongated tongue extending at right angles to said blade, of an arcuately shaped instrument having a pair of substantially flat faces, at least one of said faces provided with angular measurement scale means thereon, said instrument comprising a pair of arcuately shaped segments arranged end-to-end, said segments having respective ends hingedly connected together whereby said segments are foldable so as to be arranged back-to-back with a flat face of one segment substantially overlying and abutting a flat face of the other segment, the outermost edge of said instrument having a radius of curvature of substantially sixteen inches, and means for detachably securing said instrument to said square when said segments are arranged end-to-end.

2. The combination as set forth in claim 1, wherein said means for detachably securing said instrument to said square includes a pair of clamping means, each of said clamping means being disposed at the end of a respective segment opposite the hinged end thereof, one of said clamping means being operable to fasten one end of one segment to one end of said tongue and the other clamping means being operable to fasten one end of the other segment to an intermediate portion of said blade.

3. The combination as set forth in claim 2, wherein said angular measurement scale means includes a plurality of radially spaced, parallel angular measurement scales, each of said scales including an arcuately extending line subdivided by a plurality of circumferentially spaced, radially extending lines, each of said radially extending lines being angularly spaced five degrees from an adjacent radially extending line.

4. The combination as set forth in claim 3, wherein said blade has an outer straight edge and said tongue has an outer straight edge, and one of said circumferentially spaced, radially extending lines is in alignment with said outer straight edge of said blade and another of said circumferentially spaced, radially extending lines is in alignment with said outer straight edge of said tongue when said instrument is attached to said square, said radially extending line in alignment with said blade outer straight edge representing the zero degree mark of a first angular scale, the ninety degree mark of second angular scale, the ninety degree mark of a third angular scale, and the one hundred eighty degree mark of a fourth angular scale, and said radially extending line in alignment with said tongue outer straight edge representing the ninety degree mark of said first angular scale, the zero degree mark of said second angular scale, the one hundred eighty degree mark of said third angular scale, and the ninety degree mark of said fourth angular scale.

5. The combination as set forth in claim 4, wherein said one flat face of said instrument provided with angular measurement scale means thereon is further provided with a combination pitch and pitch scale thereon, said circumferentially spaced, radially extending line in alignment with said blade outer straight edge representing the zero pitch and 12.0 pitch-cut of said combination pitch and pitch-cut scale.

References Cited

UNITED STATES PATENTS

| | | | |
|---|---|---|---|
| 334,457 | 1/1886 | McCann | 33—117 X |
| 787,248 | 4/1905 | Wilson | 33—105 |
| 960,196 | 5/1910 | Powell | 33—89 X |
| 1,400,626 | 12/1921 | Rodriguez | 33—89 |
| 1,488,899 | 4/1924 | Arimitsu | 33—75 |
| 1,541,179 | 6/1925 | Parkinson | 33—98 X |
| 1,839,014 | 12/1931 | De Guerre | 33—105 |
| 2,549,950 | 4/1951 | Walton | 33—93 X |

FOREIGN PATENTS

| | | |
|---|---|---|
| 125,743 | 8/1959 | Russia. |

LEONARD FORMAN, *Primary Examiner.*

HARRY N. HAROIAN, *Assistant Examiner.*